(12) United States Patent
Tago et al.

(10) Patent No.: US 7,397,525 B2
(45) Date of Patent: Jul. 8, 2008

(54) LIQUID CRYSTAL DISPLAY DEVICE

(75) Inventors: Chigusa Tago, Fukaya (JP); Yuzo Hisatake, Yokohama (JP); Akio Murayama, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 423 days.

(21) Appl. No.: 11/136,367

(22) Filed: May 25, 2005

(65) Prior Publication Data

US 2005/0264735 A1 Dec. 1, 2005

(30) Foreign Application Priority Data

May 27, 2004 (JP) ............... 2004-158159

(51) Int. Cl.
*G02F 1/1335* (2006.01)
(52) U.S. Cl. ...................... 349/119; 349/117
(58) Field of Classification Search ............. 349/117, 349/119, 118, 120, 121
See application file for complete search history.

(56) References Cited

U.S. PATENT DOCUMENTS

| | | | | |
|---|---|---|---|---|
| 6,801,283 | B2 * | 10/2004 | Koyama et al. | 349/119 |
| 7,012,662 | B2 * | 3/2006 | Kim et al. | 349/114 |
| 2001/0055082 | A1 | 12/2001 | Kubo et al. | |
| 2003/0016324 | A1 | 1/2003 | Jisaki et al. | |
| 2004/0135949 | A1 | 7/2004 | Maeda | |

FOREIGN PATENT DOCUMENTS

JP 2003-207782 7/2003

OTHER PUBLICATIONS

M. G. Destriau, et al., "Réalisation d'un quart d'onde quasi achromatique par juxtaposition de deux lames cristallines de même nature", Journal de Physique et le Radium, vol. 10, XP-008022613, Feb. 1949, pp. 53-55.
T. Ishinabe, et al., "A Wide Viewing Angle Polarizer and a Quarter-Wave Plate with a Wide Wavelength Range for Extremely High Quality LCD's", IDW '01, (2001), pp. 485-488.
Yoshihisa Iwamoto, et al., "Improvement of Display Performance of High Transmittance Photo-Aligned Multi-Domain Vertical Alignment LCDs using Circular Polarizers", IDW '02, (2002), pp. 85-88.

* cited by examiner

*Primary Examiner*—David C. Nelms
*Assistant Examiner*—David Y Chung
(74) *Attorney, Agent, or Firm*—Oblon, Spivak, McClelland, Maier & Neustadt, P.C.

(57) ABSTRACT

A first phase plate and a third phase plate, which constitute a polarizer structure, cooperate to impart a phase difference of a ¼ wavelength to linearly polarized light that emerges from a first polarizer plate. A second phase plate and a fourth phase plate cooperate to impart a phase difference of a ¼ wavelength to linearly polarized light that emerges from a second polarizer plate. Slow axes in planes of the first phase plate and the second phase plate are substantially parallel. A crossed-axes angle between slow axes in planes of the first phase plate and the third phase plate is 60°, a crossed-axes angle between slow axes in planes of the second phase plate and the fourth phase plate is 60°, and a crossed-axes angle between slow axes in planes of the third phase plate and fourth phase plate is 60°.

10 Claims, 9 Drawing Sheets

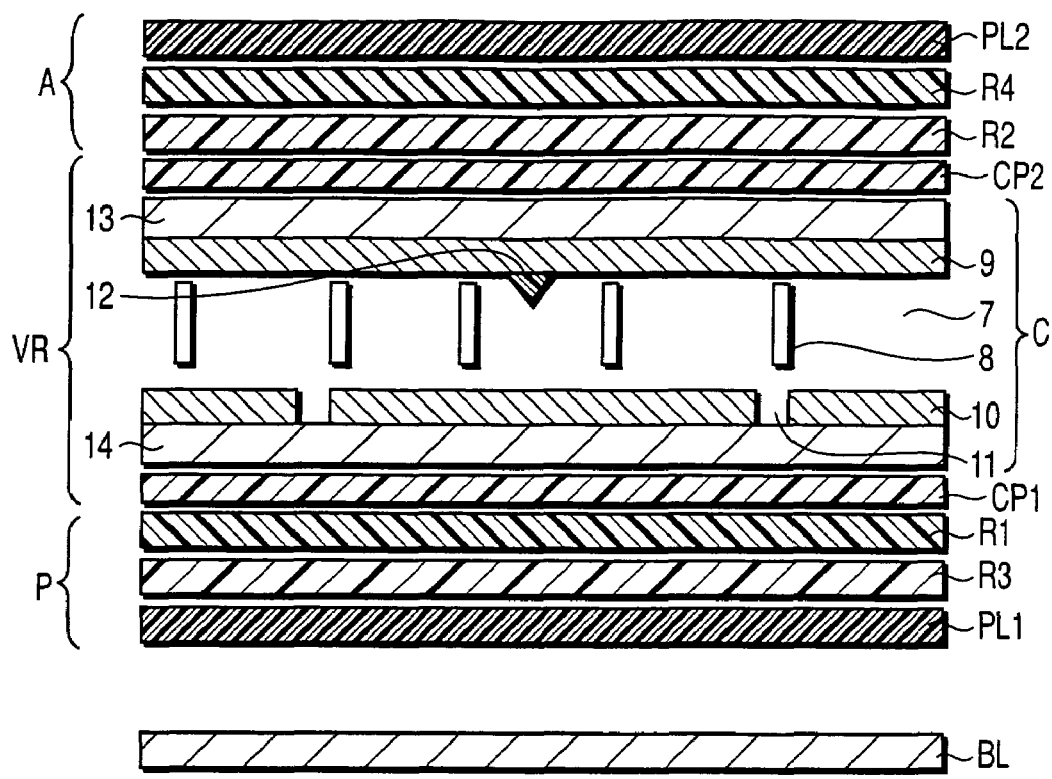
F I G. 1
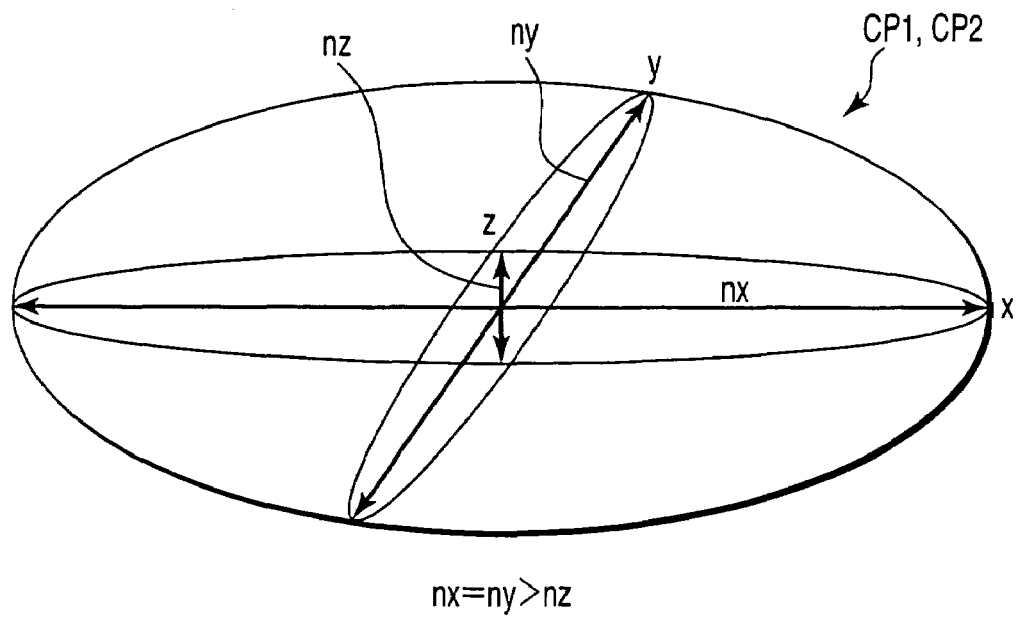
nx=ny>nz
F I G. 2

$$\theta 1 = \theta p1 + 2\cdot(\theta 3 - \theta p1) \pm \frac{\pi}{4}$$

$$\theta 2 = \theta p2 + 2\cdot(\theta 4 - \theta p2) \pm \frac{\pi}{4}$$

$\Theta 3=45°$ $\Theta 3=75°$ nx>ny>nz

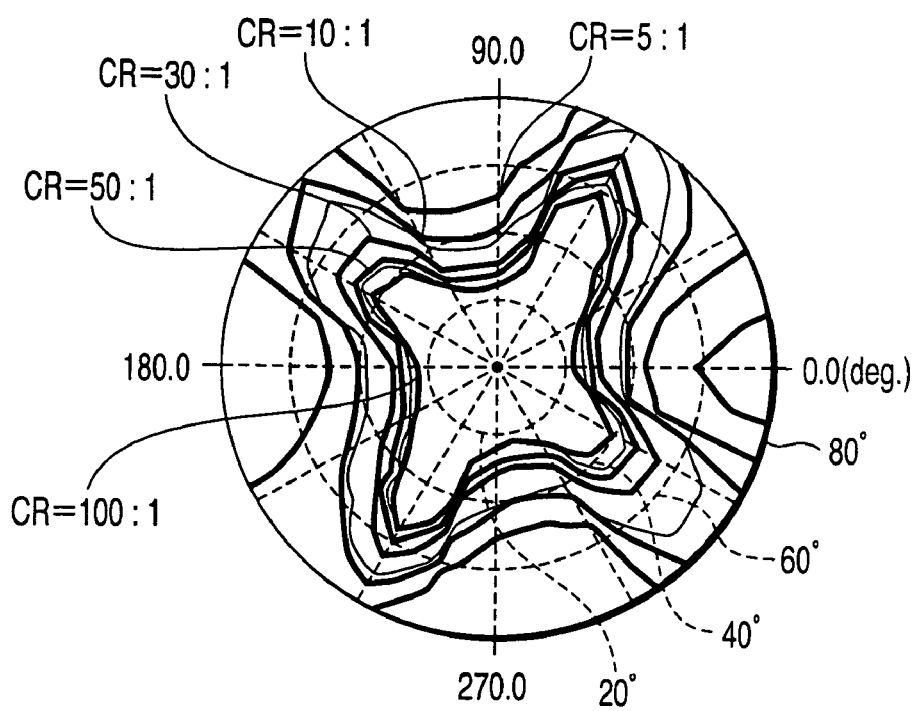
F I G. 11
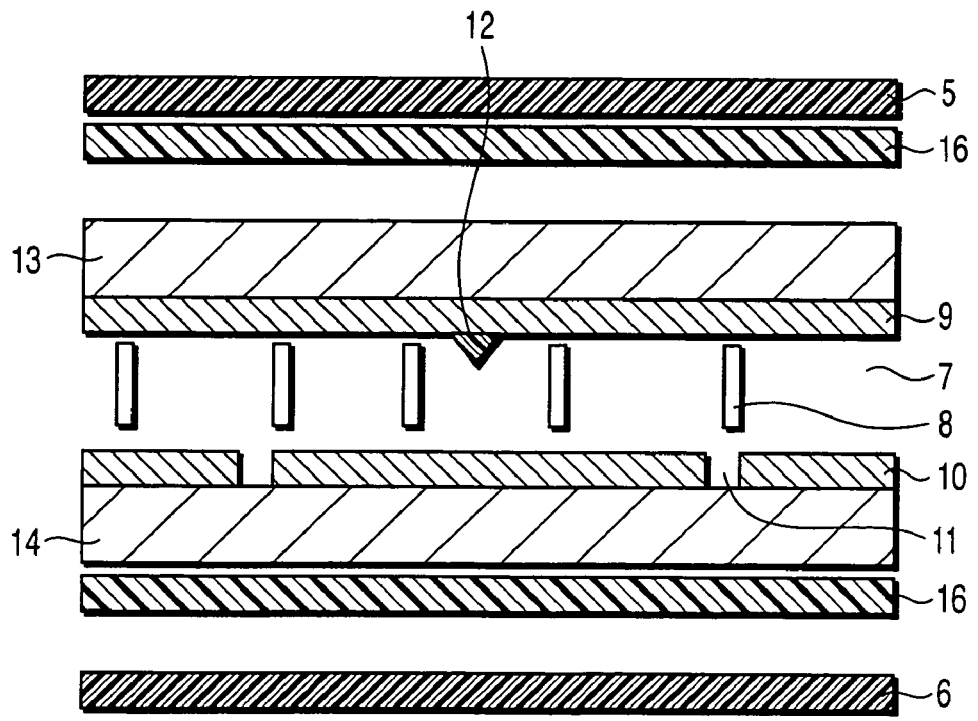
F I G. 12

LIQUID CRYSTAL DISPLAY DEVICE

CROSS-REFERENCE TO RELATED APPLICATIONS

This application is based upon and claims the benefit of priority from prior Japanese Patent Application No. 2004-158159, filed May 27, 2004, the entire contents of which are incorporated herein by reference.

BACKGROUND OF THE INVENTION

1. Field of the Invention

The present invention relates to a liquid crystal display device, and more particular to a circular-polarization-based vertical-alignment-mode liquid crystal display device.

2. Description of the Related Art

A liquid crystal display device has various features such as thickness in size, light weight, and low power consumption. The liquid crystal display device is applied to various uses, e.g. OA equipment, information terminals, timepieces, and TVs. In particular, a liquid crystal display device comprising thin-film transistors (TFTs) has high responsivity and, therefore, it is used as a monitor of a mobile TV, a computer, etc., which displays a great deal of information.

In recent years, with an increase in quantity of information, there has been a strong demand for higher image definition and higher display speed. Of these, the higher image definition is realized, for example, by making finer the array structure of the TFTs.

On the other hand, in order to increase the display speed, consideration has been given to, in place of conventional display modes, an OCB (Optically Compensated Birefringence) mode, a VAN (Vertically Aligned Nematic) mode, a HAN (Hybrid Aligned Nematic) mode and a π alignment mode, which use nematic liquid crystals, and an SSFLC (Surface-Stabilized Ferroelectric Liquid Crystal) mode and an AFLC (Anti-Ferroelectric Liquid Crystal) mode, which use smectic liquid crystals.

Of these display modes, the VAN mode, in particular, has a higher response speed than in the conventional TN (Twisted Nematic) mode. An additional feature of the VAN mode is that a rubbing process, which may lead to a defect such as an electrostatic breakage, can be made needless by vertical alignment. Particular attention is drawn to a multi-domain VAN mode (hereinafter referred to as "MVA mode") in which a viewing angle can be increased relatively easily.

In the MVA mode, for example, mask rubbing and pixel electrode structures are devised, or a protrusion is provided within a pixel. Thereby, the inclination of an electric field, which is applied to the pixel region from the pixel electrode and counter-electrode, is controlled. The pixel region of the liquid crystal layer is divided into, e.g. four domains such that the orientation directions of liquid crystal molecules are inclined at 90° to each other in a voltage-on state. This realizes improvement in symmetry of viewing angle characteristics and suppression of an inversion phenomenon.

In addition, a negative phase plate is used to compensate the viewing angle dependency of the phase difference of the liquid crystal layer in the state in which the liquid crystal molecules are oriented substantially vertical to the major surface of the substrate, that is, in the state of black display. Thereby, the contrast (CR) that depends on the viewing angle is improved. Besides, more excellent viewing angle/contrast characteristics can be realized in the case where the negative phase plate is a biaxial phase plate having such an in-plane phase difference as to compensate the viewing angle dependency of the polarizer plate, too.

In the conventional MVA mode, however, since each pixel has a multi-domain structure, a region, where liquid crystals are oriented in a direction other than a desirable direction, is formed. For example, liquid crystals are schlieren-oriented or orientated in an unintentional direction, at a boundary of the divided domains, at a protrusion in the multi-domain pixel, or near a pixel electrode slit.

The transmittance Tlp(LC) of a liquid crystal layer, under crossed Nicols, of a liquid crystal display device, which uses a linear polarizer plate and executes a linear-polarization-based birefringence control, is expressed by $$T1p(LC) = I_0 \cdot \sin^2(2\theta) \cdot \sin^2\left(\frac{\Delta n(\lambda, V) \cdot d}{\lambda}\pi\right) \quad (1)$$

In equation (1), $I_0$ is the transmittance of linearly polarized light that is parallel to the transmission axis of the polarizer plate, θ is the angle between the slow axis of the liquid crystal layer and the optical axis of the polarizer plate, V is a voltage applied, d is the thickness of the liquid crystal layer, and λ is the wavelength of incident light to the liquid crystal display device.

In equation (1), the refractive index anisotropy Δn(λ, V) depends on an effective application voltage in the region and the inclination angle of each nematic liquid crystal molecule. In order to vary T(LC) to 0 to $I_0$, it is necessary to vary Δn(λ, V)d/λ in a range of 0 to λ/2 and to set the value of θ at π/4(rad). Consequently, in the region where the liquid crystal molecules are oriented in a direction other than π/4, the transmittance decreases. As mentioned above, in the MVA mode, the multi-domain structure is adopted and thus such a region is necessarily formed. Hence, in the MVA mode, a problem, such as low transmittance, occurs, compared to the TN mode.

In order to overcome this problem, a circular-polarization-based MVA mode has currently been studied. The above problem is solved by replacing the linear polarizer plate with a circular polarizer plate, which has a phase plate, that is, a uniaxial ¼ wavelength plate that provides a phase difference of a ¼ wavelength between light rays of predetermined wavelengths that travel along the fast axis and slow axis. The transmittance Tcp(LC) of a liquid crystal layer, under crossed Nicols, of a liquid crystal display device, which uses a circular polarizer plate and executes a circular-polarization-based birefringence control, is expressed by $$Tcp(LC) = I_0 \cdot \sin^2\left(\frac{\Delta n(\lambda, V) \cdot d}{\lambda}\pi\right) \quad (2)$$

As is understood from equation (2), the transmittance Tcp(LC) does not depend on the orientation direction of liquid crystal molecules. Thus, a desired transmittance can be obtained only if the inclination of liquid crystal molecules can be controlled, despite the formation of a region where liquid crystals are oriented in a direction other than a desirable direction, for example, a region where liquid crystals are schlieren-oriented or orientated in an unintentional direction at a boundary of the divided domains and near the multi-domain structure.

In the prior-art circular-polarization-based MVA mode, however, there is such a problem that the viewing angle characteristic range is narrow.

FIG. 7 shows an example of the cross-sectional structure of a prior-art liquid crystal display device of a circular-polarization-based MVA mode. As is shown in FIG. 7, a first substrate 13 has a common electrode 9 of ITO (indium tin oxide) on an inner surface thereof. The common electrode 9 is provided with a protrusion 12 for forming a multi-domain structure within a pixel. A second substrate 14, which is opposed to the first substrate 13, has a pixel electrode 10 of ITO on an inner surface thereof. The second substrate 14 has slits 11 (where no pixel electrode is provided) for forming the multi-domain structure within the pixel. A nematic liquid crystal 7 with negative dielectric anisotropy is sandwiched between the common electrode 9 and pixel electrode 10. An orientation process is executed such that liquid crystal molecules 8 are aligned substantially vertical to the major surface of the substrate in a voltage-off state.

The liquid crystal cell with the above structure includes phase plates 3 and 4 and polarizer plates 5 and 6, which are provided on both outer surfaces of the liquid crystal cell. The phase plate 3, 4 is a uniaxial ¼ wavelength plate having refractive index anisotropy (nx>ny=nz). The slow axis of the phase plate 3, 4 has an angle of π/4 (rad), relative to the transmission axis of the polarizer plate 5, 6.

In the above structure, the paired phase plates 3 and 4 are configured to have slow axes that are intersect at right angles with each other, and thus function as negative phase plates. For example, a negative phase difference of about −280 mm is imparted to light with a wavelength of 550 nm. On the other hand, in order to obtain a phase difference of ½ wavelength by an electric field control, the liquid crystal layer 7 needs to have the value of Δn·d of 300 nm or more, which is obtained by multiplying the refractive index anisotropy Δn of the material by the thickness d of the liquid crystal layer. Consequently, the total phase difference of the liquid crystal display device does not become zero, and the viewing angle characteristics at the black display time deteriorate. In addition, since the uniaxial ¼ wavelength plate is used, a viewing angle dependency occurs in polarization characteristics of circularly polarized light that enters the liquid crystal layer, owing to the viewing angle characteristics of the polarizer plate.

As described above, in the prior-art circular-polarization-based MVA mode, substantially circularly polarized light is produced as the incident light that enters the liquid crystal layer. Thereby, the above-mentioned problem of low transmittance is overcome. However, there is such a problem that the contrast/viewing angle characteristic range is narrow because of lack of means for compensating the viewing angle dependency of circularly polarized light, which enters the liquid crystal layer, or the viewing angle dependency of the phase difference of the liquid crystal layer.

FIG. 8 shows an example of the measurement result of isocontrast curves of the liquid crystal display device having the structure shown in FIG. 7. The 0 deg. azimuth and 180 deg. azimuth correspond to the horizontal direction of the screen, and the 90 deg. azimuth and 270 deg. azimuth correspond to the vertical direction of the screen. As is shown in FIG. 8, the viewing angle with a contrast ratio of 10:1 is ±40° in the vertical direction and horizontal direction, and is narrow. Practically tolerable characteristics are not obtained.

An approach to address this problem has been proposed, wherein the uniaxial ¼ wavelength plate is replaced with a biaxial ¼ wavelength plate having refractive index anisotropy (nx>ny>nz) as shown in FIG. 10, thereby compensating the viewing angle dependency of circularly polarized light that enters the liquid crystal layer, and improving the viewing angle characteristics.

FIG. 9 shows an example of the cross-sectional structure of the circular-polarization-based MVA mode liquid crystal display device that uses biaxial ¼ wavelength plate 15 as shown in FIG. 10. In this structure, the ¼ wavelength plate has a refractive index ellipsoid of nx>ny>nz, as shown in FIG. 10. Thus, the in-plane phase difference is ¼ wavelength. If the upper and lower ¼ wavelength plates are disposed such that their in-plane slow axes intersect at right angles with each other, they function as negative phase plates. If their phase difference value is controlled, the phase difference in the normal direction of the liquid crystal layer can be compensated, and the viewing angle characteristics are improved.

FIG. 11 shows an actual measurement result of isocontrast curves of the circular-polarization-based MVA mode liquid crystal display device shown in FIG. 9. Compared to the result shown in FIG. 8, it is understood that the viewing angle is slightly increased and the characteristics are improved. However, the viewing angle with a contrast ratio of 10:1 or more is about ±80° and is wide in the oblique directions, but the viewing angle with a contrast ratio of 10:1 or more is about ±40° in the vertical and horizontal directions, which fails to satisfy practically tolerable viewing angle characteristics. The reason is as follows. The phase difference in the normal direction of the liquid crystal layer is improved to some degree by the above-described biaxial ¼ wavelength plates. An actually usable film, however, is a high-polymer film, and it is difficult to match it with wavelength dispersion of the phase difference of the liquid crystal layer. Furthermore, the film, as a circular polarizer plate, does not have such a structure as to have sufficient viewing angle characteristics, and this leads to the above-mentioned viewing angle characteristics of the contrast ratio.

To solve the problem, a circular-polarization-based MVA mode liquid crystal display device has been proposed, which uses a biaxial ¼ wavelength plate having a refractive index anisotropy as shown in FIG. 13, in place of the biaxial ¼ wavelength plate shown in FIG. 10.

FIG. 12 shows an example of the cross-sectional structure of a circular-polarization-based MVA mode liquid crystal display device that uses the biaxial ¼ wavelength plate 16 shown in FIG. 13. In this structure, the ¼ wavelength plate has a refractive index ellipticity of nx>ny<nz, as shown in FIG. 13. Like the structures shown in FIG. 7 and FIG. 9, the ¼ wavelength plates 16 and polarizer plates 5 and 6 are disposed on the outer surfaces of the MVA mode liquid crystal cell.

In the structure shown in FIG. 12, the ¼ wavelength plate that is used has a refractive index of ny<nz. Thus, even in the case where nx>nz and the ¼ wavelength plates are disposed above and below the liquid crystal cell so as to have slow axes perpendicular to each other, the effect of the negative phase difference is weakened, compared to the structure shown in FIG. 7 in which the upper and lower uniaxial ¼ wavelength plates are disposed to be perpendicular to each other. In the case where nx<nz, a positive phase difference occurs. Consequently, the contrast/viewing angle characteristic range becomes narrower than in the structure shown in FIG. 7, unless the refractive index anisotropy Δn of the liquid crystal layer is set to be very small, that is, unless the variation in phase difference of the liquid crystal layer is set below ½ wavelength and the transmittance of the liquid crystal cell becomes insufficient.

FIG. 14 shows an actual measurement result of isocontrast curves of the circular-polarization-based MVA mode liquid crystal display device shown in FIG. 12. As shown in FIG. 14, there occurs a region where the contrast ratio is 1:1 or less, and it is understood that the viewing angle characteristic range is narrower than in FIG. 8 or FIG. 11. This is partly because the structure of the polarizer plate, like the structure shown in FIG. 9, is not configured to obtain sufficient viewing angle characteristics as a circular polarizer plate.

Each of the structures shown in FIG. 9 and FIG. 12 uses the biaxial ¼ wavelength plate. The biaxial phase plate is formed by biaxial-drawing a high-polymer film, which leads to an increase in manufacturing cost. In addition, the refractive index is controllable only in a limited range, and it is difficult to realize a desired refractive index ellipsoid. Moreover, the range of selection of material for obtaining biaxiality is narrow, and it is difficult to match the material with the wavelength dispersion characteristic of the refractive index of the liquid crystal (see, for instance, T. Ishinabe et al., A Wide Viewing Angle Polarizer and a Quarter-wave Plate with a Wide Wavelength Range for Extremely High Quality LCDs, IDW '01 Proceedings, p. 485 (2001), and Y. Iwamoto et al., Improvement of Display Performance of High Transmittance Photo-Aligned Multi-domain Vertical Alignment LCDs Using Circular Polarizers, IDW '02 Proceedings, p. 85 (2002)).

BRIEF SUMMARY OF THE INVENTION

The present invention has been made in consideration of the above-described problems, and the object of the invention is to provide a liquid crystal display device that can improve viewing angle characteristics and can reduce cost.

According to an aspect of the invention, there is provided a liquid crystal display device comprising:

a first polarizer plate that is disposed on one side of a liquid crystal cell in which a liquid crystal layer is sandwiched between two electrode-equipped substrates;

a second polarizer plate that is disposed on the other side of the liquid crystal cell;

a first phase plate that is disposed between the first polarizer plate and the liquid crystal cell;

a second phase plate that is disposed between the second polarizer plate and the liquid crystal cell;

a third phase plate that is disposed between the first polarizer plate and the first phase plate; and a fourth phase plate that is disposed between the second polarizer plate and the second phase plate, wherein the first phase plate and the third phase plate cooperate to impart a phase difference of a ¼ wavelength to linearly polarized light that emerges from the first polarizer plate, and the second phase plate and the fourth phase plate cooperate to impart a phase difference of a ¼ wavelength to linearly polarized light that emerges from the second polarizer plate, slow axes in planes of the first phase plate and the second phase plate are substantially parallel, and a slow axis of the first phase plate and the second phase plate, a slow axis of the third phase plate and a slow axis of the fourth phase plate are disposed in such directions as to cancel in-plane anisotropies.

The present invention may provide a liquid crystal display device that can improve viewing angle characteristics and can reduce cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 schematically shows an example of the cross-sectional structure of a liquid crystal display device according to an embodiment of the present invention;

FIG. 2 is a view for explaining a refractive index ellipsoid of a phase plate (C-plate) that is applicable to the liquid crystal display device shown in FIG. 1;

FIG. 11 shows an example of isocontrast curves of the liquid crystal display device shown in FIG. 9;

FIG. 12 is a view for explaining an example of the cross-sectional structure of a prior-art liquid crystal display device;

DETAILED DESCRIPTION OF THE INVENTION

Figure 3:
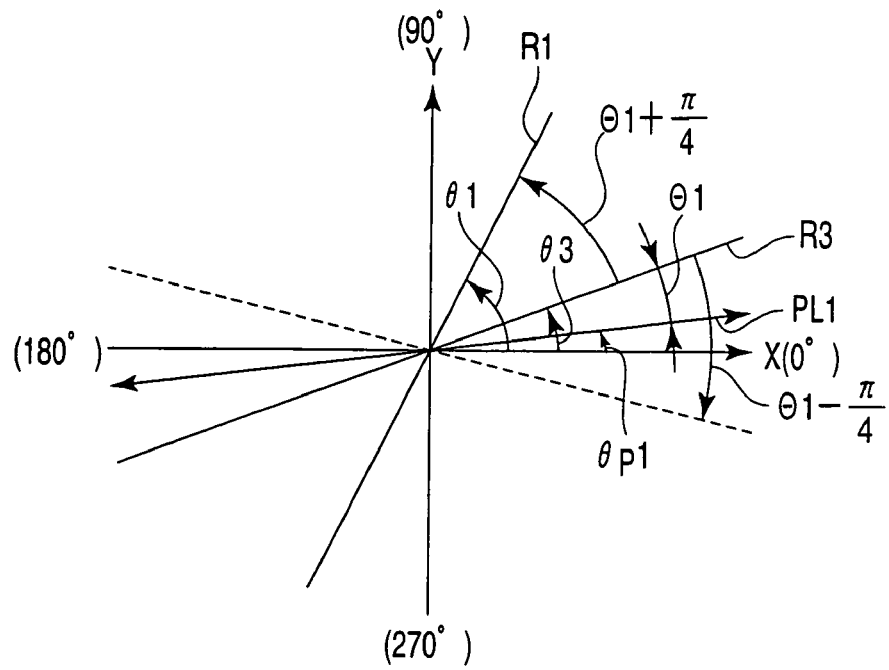
FIG. 3 is a view for explaining the relationship between angles of axes of a polarizer plate and phase plates that form a polarizer structure, which is applicable to the liquid crystal display device shown in FIG. 1.

A liquid crystal display device according to an embodiment of the present invention will now be described with reference to the accompanying drawings.

FIG. 1 schematically shows the structure of a liquid crystal display device according an embodiment of the invention. The liquid crystal display device to be described here is, in particular, of a circular-polarization-based vertical alignment mode wherein liquid crystal molecules in each pixel are aligned substantially vertical to the major surface of a substrate in a voltage-off state in which no voltage is applied to a liquid crystal layer. The invention, however, is applicable to a vertical-electric-field type electrically controlled birefringence (ECB) mode liquid crystal display device that is provided with means for applying a voltage between two electrode-equipped substrates.

The liquid crystal display device shown in FIG. 1 comprises a polarizer structure P, a variable retarder structure VR and an analyzer structure A. The variable retarder structure VR is disposed between the polarizer structure P and analyzer structure A.

The variable retarder structure VR includes a dot-matrix liquid crystal cell C in which a liquid crystal layer is held between two electrode-equipped substrates. This liquid crystal cell C is an MVA mode liquid crystal cell, and a liquid crystal layer 7 is sandwiched between an active matrix substrate 14 and an counter substrate 13. The distance between the active matrix substrate 14 and counter substrate 13 is kept constant by a spacer (not shown).

The active matrix substrate 14 is configured to include an insulating substrate with light transmissivity, such as a glass substrate. One major surface of the active matrix substrate 14 is provided with, e.g. various lines such as scan lines and signal lines, and switching elements provided near intersections of the scan lines and signal lines. Pixel electrodes 10, which are connected to the switching elements of the individual pixels, are provided on the active matrix substrate 14. The surfaces of the pixel electrodes 10 are covered with an orientation film that controls the orientation of liquid crystal molecules included in the liquid crystal layer 7.

The various lines, such as scan lines and signal lines, are formed of aluminum, molybdenum, copper, etc. The switching element is a thin-film transistor (TFT) including a semiconductor layer of, e.g. amorphous silicon or polysilicon, and a metal layer of, e.g. aluminum, molybdenum, chromium, copper or tantalum. The switching element is connected to the scan line, signal line and pixel electrode 10. On the active matrix substrate 14 with this structure, a voltage can selectively be applied to a desired one of the pixel electrodes 10.

The pixel electrode 10 may be formed of an electrically conductive material with light transmissivity, such as ITO (Indium Tin Oxide). The orientation film is formed of a thin film of a resin material with light transmissivity, such as polyimide. In this embodiment, the orientation film is not subjected to a rubbing process, and liquid crystal molecules 8 are vertically oriented.

The counter substrate 13 is configured to include an insulating substrate with light transmissivity, such as a glass substrate. A common electrode 9 is provided on one major surface of the counter substrate 13. The surface of the common electrode 9 is covered with an orientation film that controls the orientation of liquid crystal molecules included in the liquid crystal layer 7. The common electrode 9, like the pixel electrode 10, may be formed of an electrically conductive material with light transmissivity, such as ITO. The orientation film, like the orientation film on the active matrix substrate 14, may be formed of a resin material with light transmissivity, such as polyimide. In this embodiment, the common electrode 9 is formed as a planar continuous film that faces all the pixel electrodes with no discontinuity.

When the present display device is constructed as a color liquid crystal device, the liquid crystal cell C includes color filter layers. The color filter layers are color layers of, e.g. the three primary colors of blue, green and red. The color filter may be provided between the insulating substrate of the active matrix substrate 14 and the pixel electrode 10 with a COA (Color Filter on Array) structure, or may be provided on the counter substrate 13.

If the COA structure is adopted, the color filter layer is provided with a contact hole, and the pixel electrode 10 is connected to the switching element via the contact hole. The COA structure is advantageous in that high-precision alignment using, e.g. alignment marks is needless when the liquid crystal cell C is to be formed by attaching the active matrix substrate 14 and counter substrate 13.

The liquid crystal layer 7 is formed of a nematic liquid crystal material with negative dielectric anisotropy. In this embodiment, MJ02151 (manufactured by Merck) is used as a liquid crystal composition. The refractive index anisotropy $\Delta n$ of the liquid crystal material is 0.093 (the wavelength for measurement is 550 nm; hereinafter, all values of the refractive index and phase difference of the phase plate are measured at the wavelength of 550 nm). The thickness d of the liquid crystal layer 7 is 3.3 µm. Accordingly, the value $\Delta n \cdot d$ is 308 nm.

The liquid crystal display device according to this embodiment adopts a multi-domain vertical alignment mode in which liquid crystal molecules within the pixel of the liquid crystal cell C are controlled to be oriented at least in two directions, regardless of a state in which a predetermined voltage is applied or irrespective of an applied voltage. In particular, in at least half the opening region of each pixel, the orientation direction of liquid crystal molecules should preferably be controlled to become substantially parallel to the absorption axis (or transmission axis) of the second polarizer plate PL2.

This orientation control can be realized by providing a protrusion 12 for multi-domain control in the pixel, as shown in FIG. 1. The orientation control can also be realized by forming a slit 11 for multi-domain control at a part of the pixel electrode 10. Further, the orientation control can be realized by providing orientation films, which are subjected to an orientation process of, e.g. rubbing, for multi-domain control, on those surfaces of the active matrix substrate 14 and counter substrate 13, which sandwich the liquid crystal layer 7. Needless to say, at least two of the protrusion 12, slit 11 and orientation film that is subjected to the orientation process may be combined.

Each of the polarizer structure P and analyzer structure A is configured to include at least one phase plate so that black display may be effected in the state in which an in-plane phase difference of the variable retarder structure VR is substantially zero. The in-plane phase difference is a phase difference occurring due to a difference between refractive indices (e.g. nx and ny) in two mutually perpendicular directions in a plane parallel to the major surface of the substrate.

The polarizer structure P is disposed on a light source side of the liquid crystal cell C, that is, on a backlight unit BL side. The polarizer structure P includes two phase plates in addition to the first polarizer plate PL1. Specifically, the polarizer structure P includes a first phase plate R1 that is disposed between the first polarizer plate PL1 and liquid crystal cell C, and a third phase plate R3 that is disposed between the first polarizer plate PL1 and the first phase plate R1.

The analyzer structure A is disposed on the observation surface side of the liquid crystal cell C. The analyzer structure A includes two phase plates in addition to the second polarizer plate PL2. Specifically, the polarizer structure P includes a second phase plate R2 that is disposed between the second polarizer plate PL2 and liquid crystal cell C, and a fourth phase plate R4 that is disposed between the second polarizer plate PL2 and the second phase plate R2.

Each of the first polarizer plate PL1 and second polarizer plate PL2 has a transmission axis and an absorption axis, which are substantially perpendicular to each other in the plane thereof. Each of the first phase plate R1 and second phase plate R2 has a fast axis and a slow axis, which are substantially perpendicular to each other in the plane thereof. Each of the first phase plate R1 and second phase plate R2 functions as a ¼ wavelength plate that provides a phase difference (in-plane phase difference) of ¼ wavelength between light rays with a predetermined wavelength (e.g. 550 nm), which pass through the fast axis and slow axis. Each of the third phase plate R3 and fourth phase plate R4 has a fast axis and a slow axis, which are substantially perpendicular to each other in the plane thereof. Each of the third phase plate R3 and fourth phase plate R4 functions as a ½ wavelength plate that provides a phase difference (in-plane phase difference) of ½ wavelength between light rays with a predetermined wavelength (e.g. 550 nm), which pass through the fast axis and slow axis.

The first phase plate R1 and third phase plate R3 cooperate to cause linearly polarized light, which has passed through the transmission axis of the first polarizer plate PL1, to go out as substantially circularly polarized light.

With respect to light with a predetermined wavelength (e.g. 550 nm), the third phase plate R3 shifts the phase of linearly polarized light that has passed through the transmission axis of the first polarizer plate PL1 (more exactly, the phase of the light ray components of linearly polarized light, which pass through the fast axis and slow axis of the third phase plate R3) by ½. In addition, with respect to light with the predetermined wavelength (e.g. 550 nm), the first phase plate R1 shifts the phase of the polarized light that has passed through the third phase plate R3 (more exactly, the phase of the light ray components of linearly polarized light, which pass through the fast axis and slow axis of the first phase plate R1) by ¼ (in the case where the third phase plate R3 shifts the phase of linearly polarized light so as to advance the phase by ½, the first phase plate R1 functions to restore the phase of the polarized light, which emerges from the third phase plate R3, by ¼).

With respect to light with a wavelength greater than the above-mentioned predetermined wavelength, the third phase plate R3 shifts the phase of linearly polarized light that has passed through the transmission axis of the first polarizer plate PL1 by a degree greater than ½. In this case, the first phase plate R1 shifts the phase of polarized light, which has passed through the third phase plate R3, by a degree greater than ¼. For example, in the case where the third phase plate R3 shifts the phase of linearly polarized light so as to advance the phase by ⅔, the first phase plate R1 functions to restore the phase of the polarized light, which emerges from the third phase plate R3, by 5/12. As a result, the phase of the linearly polarized light is displaced by ⅔−5/12=¼, and the same polarization state (=circular polarization) as with the predetermined wavelength is obtained.

On the other hand, with respect to light with a wavelength less than the above-mentioned predetermined wavelength, the third phase plate R3 shifts the phase of linearly polarized light that has passed through the transmission axis of the first polarizer plate PL1 by a degree less than ½. In this case, the first phase plate R1 shifts the phase of polarized light, which has passed through the third phase plate R3, by a degree less than ¼. In cooperation, the phase of the linearly polarized light is shifted by ¼, and the same polarization state (=circular polarization) as with the predetermined wavelength is obtained.

Similarly, the second phase plate R2 and fourth phase plate R4 are configured to cooperate to shift the phase of linearly polarized light, which emanates from the variable retarder structure VR, by ¼.

The variable retarder structure VR has compensation means for compensating the viewing-angle characteristics of the normal-directional phase difference of the liquid crystal cell C. Specifically, the liquid crystal cell C has a positive phase difference $R_{LC}$ (Δn·d=308 nm) in its normal direction. On the other hand, the polarizer structure P and analyzer structure A have negative phase differences $R_P$ and $R_A$ in their normal directions. The normal-directional phase difference $R_P$ of the polarizer structure P corresponds to the sum of normal-directional phase differences of a base film of, e.g. triacetate cellulose (TAC), which constitutes the first polarizer plate PL1, the first phase plate R1 and the third phase plate R3. The normal-directional phase difference $R_A$ of the analyzer structure A corresponds to the sum of normal-directional phase differences of a base film of, e.g. TAC, which constitutes the second polarizer plate PL2, the second phase plate R2 and the fourth phase plate R4.

If the sum of the normal-directional phase difference $R_{LC}$ of liquid crystal cell C, the normal-directional phase difference $R_P$ of polarizer structure P and the normal-directional phase difference $R_A$ of analyzer structure A is zero, a good display quality is obtained regardless of the viewing angle at which the liquid crystal display device is viewed. However, if $R_{LC}+R_P+R_A \neq 0$, compensation means for compensating the phase differences is needed. In the case where $R_{LC}>|R_P+R_A|$, it should suffice if a phase plate having a negative phase difference in the normal direction is disposed. The normal-directional phase difference of this compensation means should be $(|R_P+R_A|-R_{LC})$.

To be more specific, the variable retarder structure VR includes an optically negative uniaxial phase plate (C-plate) with a refractive index anisotropy of nx=ny>nz, which is disposed at least between the liquid crystal cell C and polarizer structure P or between the liquid crystal cell C and analyzer structure A. In the embodiment shown in FIG. 1, the variable retarder structure VR includes a first C-plate CP1 that is disposed between the liquid crystal cell C and first phase plate R1, and a second C-plate CP2 that is disposed between the liquid crystal cell C and second phase plate R2.

A C-plate with a refractive index ellipsoid (nx=ny>nz), as shown in FIG. 2, is applicable to the first C-plate CP1 and second C-plate CP2. In FIG. 2, nx and ny indicate refractive indices in two direction that intersect at right angles in a plane of the C-plate, and nz indicates a refractive index in a direction normal to the major surface of the C-plate. The viewing-angle characteristics of the liquid crystal cell C can be improved by setting the sum of the normal-directional phase differences of the first C-plate CP1 and second C-plate CP2 to be substantially equal to $(|R_P+R_A|-R_{LC})$. As mentioned above, if $R_{LC}+R_P+R_A \neq 0$, there is no need to dispose the first C-plate CP1 or second C-plate CP2, and they may be omitted.

In the meantime, each of the polarizer structure P and analyzer structure A is configured so that black display may be effected in the state in which an in-plane phase difference of the variable retarder structure VR is substantially zero. In other words, the polarizer structure P and analyzer structure A are configured to have different polarities (i.e. opposite polarities). To be more specific, one of the polarizer structure P and analyzer structure A is constructed as a clockwise circular polarizer that emits clockwise circularly polarized light, as viewed in the direction of travel of light, and the other is constructed as a counterclockwise circular polarizer that emits counterclockwise circularly polarized light, as viewed in the direction of travel of light.

With this structure, circularly polarized light (e.g. clockwise circularly polarized light), which has passed through the polarizer structure P, passes through the variable retarder structure VR, which has substantially zero in-plane phase difference, while maintaining its polarization state. The circularly polarized light is then absorbed in the analyzer structure A that has the opposite polarity (e.g. counterclockwise circularly polarized light). Thus, theoretically, desired black display can be effected even when the liquid crystal display device is viewed in either direction, and high-contrast display is enabled.

In order to realize the above function, it is necessary that the polarizer structure P and analyzer structure A be nearly perfect circular polarizers with opposite polarities. In general, a circular polarizer is constructed by combining a polarizer plate that emits linearly polarized light, and a phase plate (¼ wavelength plate) that imparts a ¼ phase difference to the linearly polarized light. More precisely, a clockwise circular polarizer is configured such that the slow axis of the phase plate is displaced clockwise by 45° relative to the transmission axis of the polarizer plate, as viewed in the direction of travel of light. Similarly, a counterclockwise circular polarizer is configured such that the slow axis of the phase plate is displaced counterclockwise by 45° relative to the transmission axis of the polarizer plate, as viewed in the direction of travel of light.

However, the ¼ wavelength plate can impart a ¼ phase difference only to linearly polarized light of a specific wavelength. In other words, an ordinary phase plate (¼ wavelength plate) that forms a circular polarizer has a wavelength dispersion of phase difference (i.e. the phase difference varies depending on wavelength). Thus, even if a circular polarizer can function as a circular polarizer for light of a specific wavelength, it cannot emit circularly polarized light with respect to light of another wavelength (i.e. the circular polarizer emits elliptically polarized light). Thus, a perfect circular polarizer without wavelength dispersion (or with negligible wavelength dispersion) cannot be constituted by the ordinary combination of a single phase plate (¼ wavelength plate) and a polarizer plate. Unless specific conditions are satisfied, desired black display cannot be realized by the polarizer structure P and analyzer A in the state in which an in-plane phase difference of the variable retarder structure VR is substantially zero.

In the present embodiment, a plurality of phase plates and a polarizer plate are combined. Thereby, each of the polarizer structure P and analyzer structure A is constructed as a perfect circular polarizer. Specifically, each of the polarizer structure P and analyzer structure A is constructed as a differential circular polarizer. More specifically, each of the polarizer structure P and analyzer structure A is constructed by combining a polarizer plate that emits linearly polarized light, a phase plate (½ wavelength plate) that imparts a ½ phase difference to linearly polarized light with a predetermined wavelength (e.g. 550 nm), and a phase plate (¼ wavelength plate) that imparts a ¼ phase difference to linearly polarized light. The ½ wavelength plate and ¼ wavelength plate are combined so that the difference between phase differences (retardation value (R)/incident wavelength (λ)), which are imparted when light passes therethrough, may become an about λ/4.

For example, the ½ wavelength plate and ¼ wavelength plate have such wavelength dispersion characteristics that retardation values $R_{\lambda/2}$ and $R_{\lambda/4}$ may decrease as the wavelength (λ) of incident light becomes greater. With respect to the wavelength dispersion characteristics, the combination of the wavelength plates and polarizer plate is optimized as follows. When the phase differences (retardation value/incident light wavelength) for the same wave-length are compared, the phase difference (retardation values ($R_{\lambda/2}$)/incident light wavelength (λ)) of the ½ wavelength plate is always greater than the phase difference (retardation values ($R_{\lambda/4}$)/ incident light wavelength (λ)) of the ¼ wavelength plate, and the difference (($R_{\lambda/2}-R_{\lambda/4}$)/λ) between the phase differences of the ½ wavelength plate and ¼ wavelength plate for the same wavelength is set at about λ/4, regardless of the incident light wavelength (λ).

Each of the polarizer structure P and analyzer structure A, which is formed by optimally combining the two phase plates (½ wavelength plate and ¼ wavelength plate) and polarizer plate, as described above, functions as a perfect circular polarizer that emits circularly polarized light by imparting a π/2 phase difference to linearly polarized light from the polarizer plate, regardless of the incident light wavelength (λ).

The conditions for optimization of the polarizer plate and two phase plates (½ wavelength plate and ¼ wavelength plate) are as follows. The first phase plate R1 and third phase plate R3 have the same characteristics of the wavelength dispersion of phase difference, and the second phase plate R2 and fourth phase plate R4 have the same characteristics of the wavelength dispersion of phase difference. In addition, as shown in FIG. 3 and FIG. 4, an X axis and a Y axis, which intersect at right angles, are defined in the major surface of the substrate of the liquid crystal display device.

As is shown in FIG. 3, when the X axis is set to be a reference axis, an angle θp1 is formed between the transmission axis of the first polarizer plate PL1 and the reference axis. An angle θ1 is formed between the slow axis of the first phase plate R1 and the reference axis, and an angle θ3 is formed between the slow axis of the third phase plate R3 and the reference axis. In this case, the first polarizer plate PL1, first phase plate R1 and third phase plate R3 are arranged so as to establish the following relationship between θp1, θ1 and θ3, $$\theta1=\theta p1+2\cdot(\theta3-\theta p1)\pm\pi/4,\ 0\leq\theta1\leq\pi$$

Thereby, the polarizer structure P is optimized and functions as a perfect circular polarizer (e.g. clockwise circular polarizer).

Figure 4:
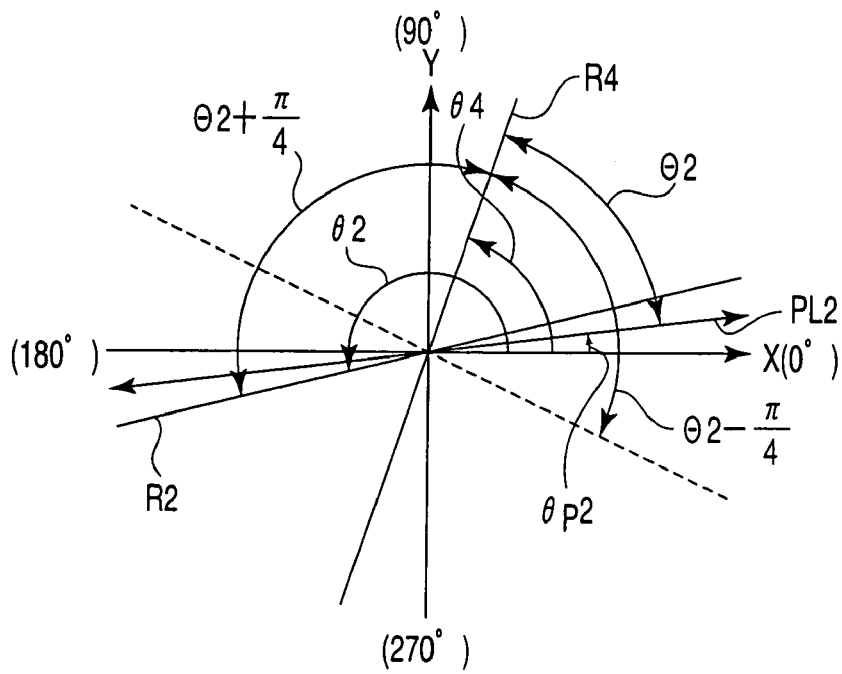
FIG. 4 is a view for explaining the relationship between angles of axes of a polarizer plate and phase plates that form an analyzer structure, which is applicable to the liquid crystal display device shown in FIG. 1.

Similarly, as is shown in FIG. 4, when the X axis is set to be a reference axis, an angle θp2 is formed between the transmission axis of the second polarizer plate PL2 and the reference axis. An angle θ2 is formed between the slow axis of the second phase plate R2 and the reference axis, and an angle θ4 is formed between the slow axis of the fourth phase plate R4 and the reference axis. In this case, the second polarizer plate PL2, second phase plate R2 and fourth phase plate R4 are arranged so as to establish the following relationship between θp2, θ2 and θ4, $$\theta2=\theta p2+2\cdot(\theta4-\theta p2)\pm\pi/4,\ 0\leq\theta2\leq\pi$$

Thereby, the analyzer structure A is optimized and functions as a perfect circular polarizer (e.g. counterclockwise circular polarizer).

The polarizer structure P and analyzer structure A are constructed as perfect circular polarizers, as described above. Thereby, desired black display can be realized in the state in which an in-plane phase difference of the variable retarder structure VR is substantially zero, regardless of the crossed-axes angle of the slow axes of the phase plates of the polarizer structure P and analyzer structure A, or the crossed-axes angle of the transmission axes of the polarizer plates of the polarizer structure P and analyzer structure A. In other words, as regards the polarizer structure P and analyzer structure A that are optimized as perfect circular polarizers, the optical axis may be set in any direction in their planes.

A specific embodiment of the present invention will now be described.

EMBODIMENT 1

In Embodiment 1, uniaxial ¼ wavelength plates (in-plane phase difference=140 nm) that are formed of ZEONOR resin (manufactured by Nitto Denko Corp.) are used as the first phase plate R1 and second phase plate R2. In addition, uniaxial ½ wavelength plates (in-plane phase difference=270 nm) that are formed of ZEONOR resin (manufactured by Nitto Denko Corp.) are used as the third phase plate R3 and fourth phase plate R4. Polarizer plates SEG1224DU (manufactured by Nitto Denko Corp.) are used as the first polarizer plate PL1 and second polarizer plate PL2. In Embodiment 1, C-plates CP1 and CP2 are disposed between the liquid crystal cell C and the polarizer structure P and between the liquid crystal cell C and the analyzer structure A. TAC films (normal-directional phase difference=−60 nm), which are manufactured by Fuji Photo Film Co., Ltd., are used as the C-plates CP1 and CP2.

The crossed-axes angle of the transmission axes of the first polarizer plate PL1 and second polarizer plate PL2 is 60°. For example, the transmission axis of the second polarizer plate PL2 is set at the reference axis. In the example shown in FIG. 3, it is assumed that the crossed-axes angle between the transmission axis of the first polarizer plate PL1 and the X axis (reference axis) is 60° ($\theta p1=60°$). In the example shown in FIG. 4, it is assumed that the transmission axis of the second polarizer plate PL2 coincides with the X axis (reference axis) ($\theta p2=0°$).

The third phase plate R3, which is disposed on the liquid crystal cell C side of the first polarizer plate PL1, is disposed such that the slow axis thereof crosses the transmission axis of the first polarizer plate PL1 at an angle $\Theta 1$ (=$\theta 3-\theta p1$). In this case, $\Theta 1=75°$, and $\theta 3=135°$. Similarly, the fourth phase plate R4, which is disposed on the liquid crystal cell C side of the second polarizer plate PL2, is disposed such that the slow axis thereof crosses the transmission axis of the second polarizer plate PL2 at an angle $\Theta 2$ (=$\theta 4-\theta p2$). In this case, $\Theta 1$ (=$\theta 4$) =15°.

The first phase plate R1, which is disposed on the liquid crystal cell C side of the third phase plate R3, is disposed such that the slow axis thereof crosses the slow axis of the third phase plate R3 at an angle ($\Theta 1+\pi/4$). That is, the angle between the slow axis of the first phase plate R1 and the transmission axis of the first polarizer plate PL1 is ($2\cdot\Theta 1+\pi/4$) (=$\theta 1-\theta p1$). In this case, ($2\cdot\Theta 1+\pi/4$)=195°, and $\theta 1=75°$ (=255°). Similarly, the second phase plate R2, which is disposed on the liquid crystal cell C side of the fourth phase plate R4, is disposed such that the slow axis thereof crosses the slow axis of the fourth phase plate R4 at an angle ($\Theta 2+\pi/4$). That is, the angle between the slow axis of the second phase plate R2 and the transmission axis of the second polarizer plate PL2 is ($2\cdot\Theta 2+\pi/4$) (=$\theta 2-\theta p2$) In this case, ($2\cdot\Theta 2+\pi/4$) (=$\theta 2$)=75°.

As has been described above, the slow axes in the planes of the two phase plates functioning as ¼ wavelength plates, i.e. the first phase plate R1 and second phase plate R2, are parallel ($\theta 1=\theta 2$), and the crossed-axes angle thereof with the X axis is 75°. The crossed-axes angle, $|\theta 1-\theta 3|$, of the slow axes in the planes of the first phase plate R1 and third phase plate R3 of the polarizer structure P is 60°. The crossed-axes angle, $|\theta 2-\theta 4|$, of the slow axes in the planes of the second phase plate R2 and fourth phase plate R4 of the analyzer structure A is 60°.

The liquid crystal cell C includes the protrusion 12 or slit 11 for multi-domain control. The protrusion 12 or slit 11 extends in parallel to the Y axis in the X-Y coordinates shown in FIG. 3 and FIG. 4, i.e. in the direction of 90° or 270°. Thereby, the orientation of liquid crystal molecules is set at 0° or 180°.

In the liquid crystal display device with this structure, a voltage of 4.2V (at white display time) and a voltage of 1.0V (at black display time; this voltage is lower than a threshold voltage of liquid crystal material, and with this voltage the liquid crystal molecules remain in the vertical alignment) were applied to the liquid crystal layer 7, and the viewing angle characteristics of the contrast ratio were evaluated.

Figure 5:
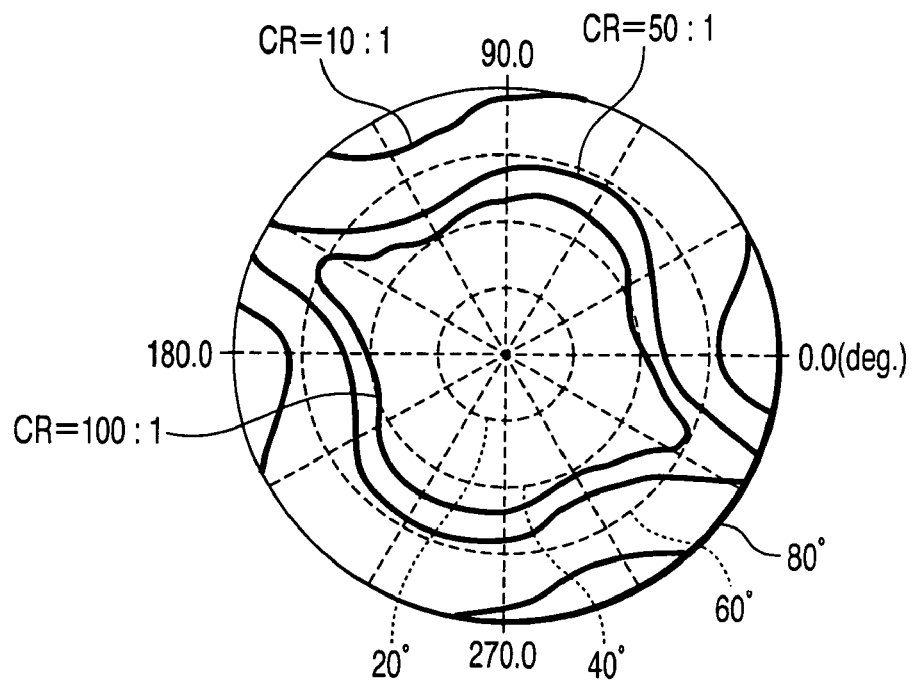
FIG. 5 shows an example of isocontrast curves of a liquid crystal display device according to Embodiment 1.

FIG. 5 shows the measurement result of isocontrast curves of the liquid crystal display device according to Embodiment 1. It was confirmed that in almost all azimuth directions, the viewing angle with a contrast ratio of 10:1 was ±80° or more, and excellent viewing angle characteristics were obtained. In addition, the transmittance at 4.2V was measured, and it was confirmed that a very high transmittance of 5.0% was obtained.

Next, the crossed-axes angles of the slow axes in the planes of the first to fourth phase plates are studied. The crossed-axes angles of the slow axes in the planes of the first to fourth phase plates are so set that the characteristic values corresponding to the viewing-angle characteristics of contrast may become a predetermined reference value or more. As is shown in FIG. 3 and FIG. 4, assume now that the crossed-axes angle between the transmission axis of the first polarizer plate PL1 and the slow axis of the third phase plate R3, which constitute the polarizer structure P, is $\Theta 1$ (=$|\theta 3-\theta p1|$), the crossed-axes angle between the transmission axis of the second polarizer plate PL2 and the slow axis of the fourth phase plate R4, which constitute the analyzer structure A, is $\Theta 2$ (=$|\theta 4-\theta p2|$), and the crossed-axes angle between the slow axes of the first phase plate R1 and second phase plate R2 is $\Theta 3$ (=$|\theta 1-\theta 2|$).

As has been described above, the crossed-axes angle ($\theta 1-\theta 3$) between the slow axes of the first phase plate R1 and third phase plate R3 meets the condition of ($\Theta 1+\pi/4$) for optimizing the combination of these phase plates. In addition, the crossed-axes angle ($\theta 2-\theta 4$) between the slow axes of the second phase plate R2 and fourth phase plate R4 meets the condition of ($\Theta 2+\pi/4$) for optimizing the combination of these phase plates.

The effect of the improvement in the viewing-angle characteristics, which is the task of the invention, can be evaluated on the basis of the characteristic value corresponding to the contrast/viewing-angle characteristics. Specifically, $\Theta 1$, $\Theta 2$ and $\Theta 3$ are set so that the characteristic value corresponding to the contrast/viewing-angle characteristics may become a reference value or more.

In this example, a contrast area value is adopted as the characteristic value corresponding to the contrast/viewing-angle characteristics. The contrast area value represents an area ($deg^2$) of a field of view with a predetermined contrast ratio or more, on the basis of the measurement result of isocontrast curves as shown in FIG. 5. In this case, the area of the field of view with a contrast ratio of 10:1 (CR=10:1) or more is adopted.

Figure 6A:
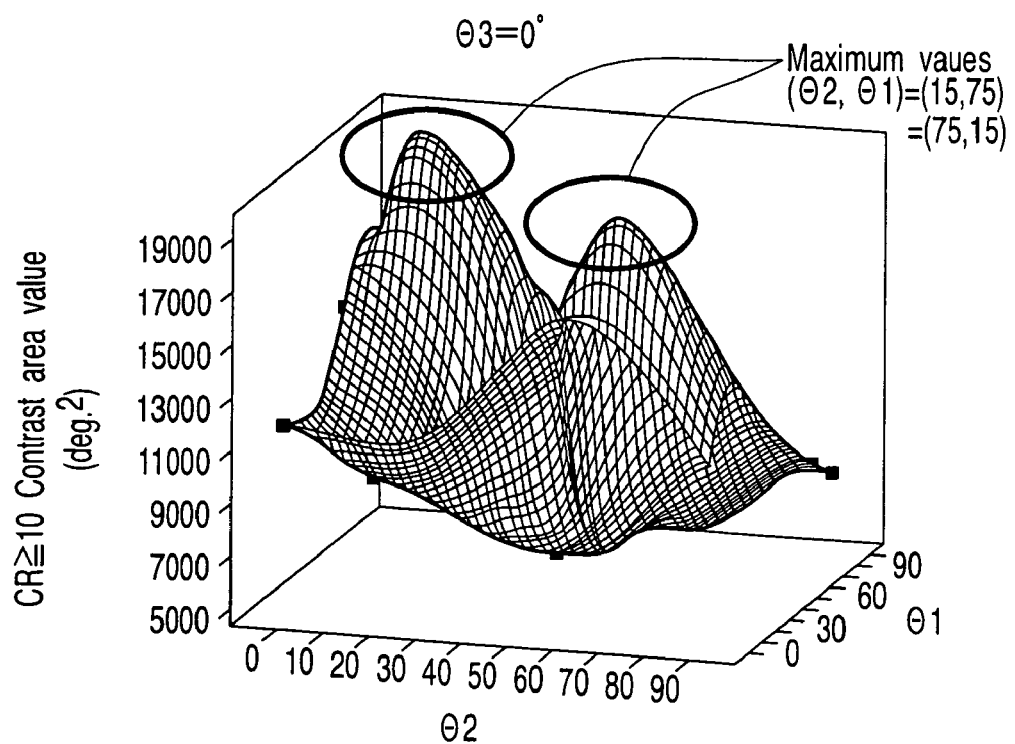
FIG. 6A shows a relationship between an area with a contrast ratio of 10:1 or more and a crossed-axes angle of slow axes of the phase plates that form the polarizer structure and analyzer structure of the liquid crystal display device shown in FIG. 1.
Figure 6B:
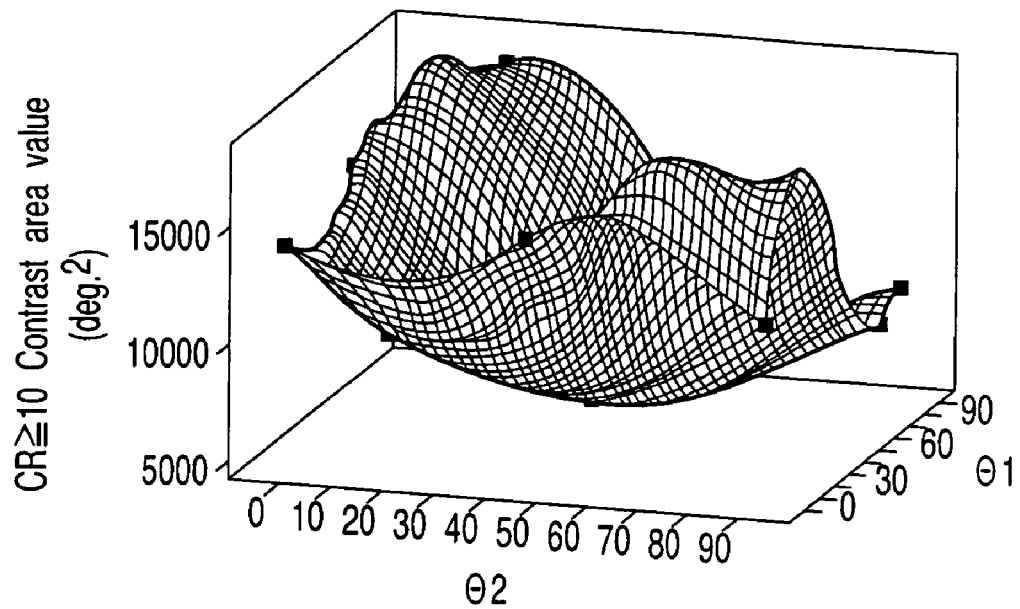
FIG. 6B shows a relationship between an area with a contrast ratio of 10:1 or more and a crossed-axes angle of slow axes of the phase plates that form the polarizer structure and analyzer structure of the liquid crystal display device shown in FIG. 1.
Figure 6C:
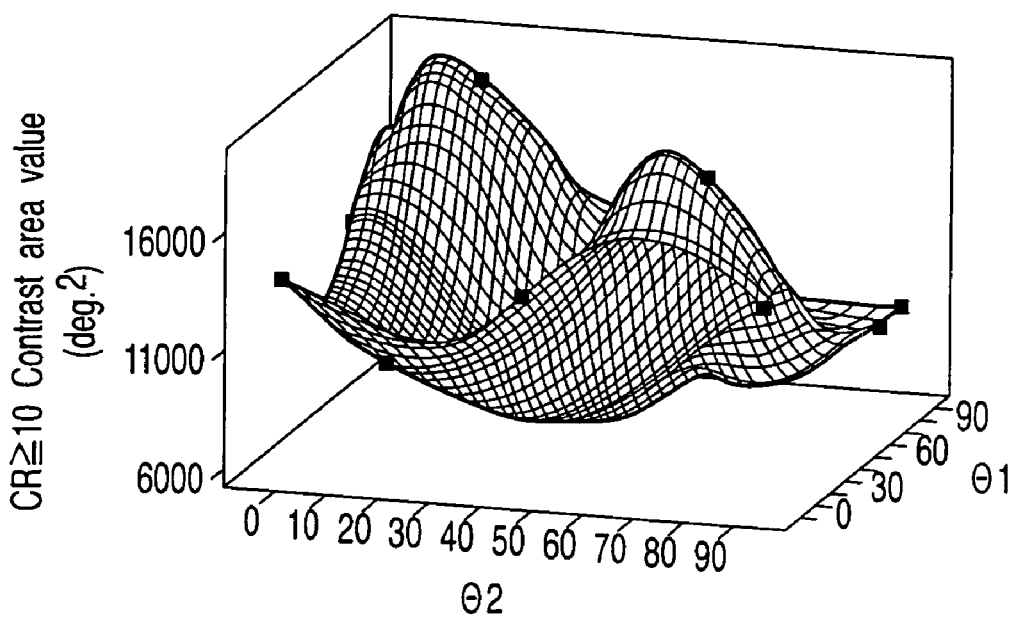
FIG. 6C shows a relationship between an area with a contrast ratio of 10:1 or more and a crossed-axes angle of slow axes of the phase plates that form the polarizer structure and analyzer structure of the liquid crystal display device shown in FIG. 1.

FIGS. 6A to 6C show measurement results of the contrast area values relating to crossed-axes angles $\Theta 1$ (°), $\Theta 2$ (°) and $\Theta 3$ (°). In the measurement, the respective liquid crystal display devices have the same basic structure, the polarizer structure is optimized so as to meet the relation-ship, $\theta1=\theta p1+2\cdot(\Theta3-\theta p1)\pm\pi/4$, and the analyzer structure is optimized so as to meet the relationship, $\theta2=\theta p2+2\cdot(\theta4-\theta p2)\pm\pi/4$.

As is clear from the measurement results in FIGS. 6A to 6C, a highest contrast area value (about 18300) was obtained when $\Theta1=75°$, $\Theta2=15°$ and $\Theta3=0°$. Various measurements were conducted and it was confirmed that a contrast area value of a reference value (=17000) or more was obtained by setting the crossed-axes angle $\Theta1$ in a range of $75°\pm5°$, the crossed-axes angle $\Theta2$ in a range of $15°\pm5°$, and the crossed-axes angle $\Theta3$ in a rage between $0°$ and $5°$.

The reason for this appears to be as follows. When $\Theta1=75°$ and $\Theta2=15°$, the crossed-axes angle, $|\theta1-\theta3|$, of the slow axes in the planes of the first phase plate R1 and third phase plate R3 is $60°$, the crossed-axes angle, $|\theta2-\theta4|$, of the slow axes in the planes of the second phase plate R2 and fourth phase plate R4 is $60°$, and the crossed-axes angle, $|\theta3-\theta4|$, of the slow axes in the planes of the third phase plate R3 and fourth phase plate R4 is $60°$. In addition, when $\Theta3=0°$, the slow axes in the planes of the first phase plate R1 and second phase plate R2 are parallel.

The fact that the slow axes of the first phase plate R1 and second phase plate R2, which function as ¼ wavelength plates, are parallel means that these phase plates, if integrated, functions as a single ½ wavelength plate. Thus, it is considered that in the present liquid crystal display device, the polarizer structure P and analyzer structure A include three phase plates (R1+R2), R3 and R4, each functioning as a ½ wavelength plate.

Figure 6D:
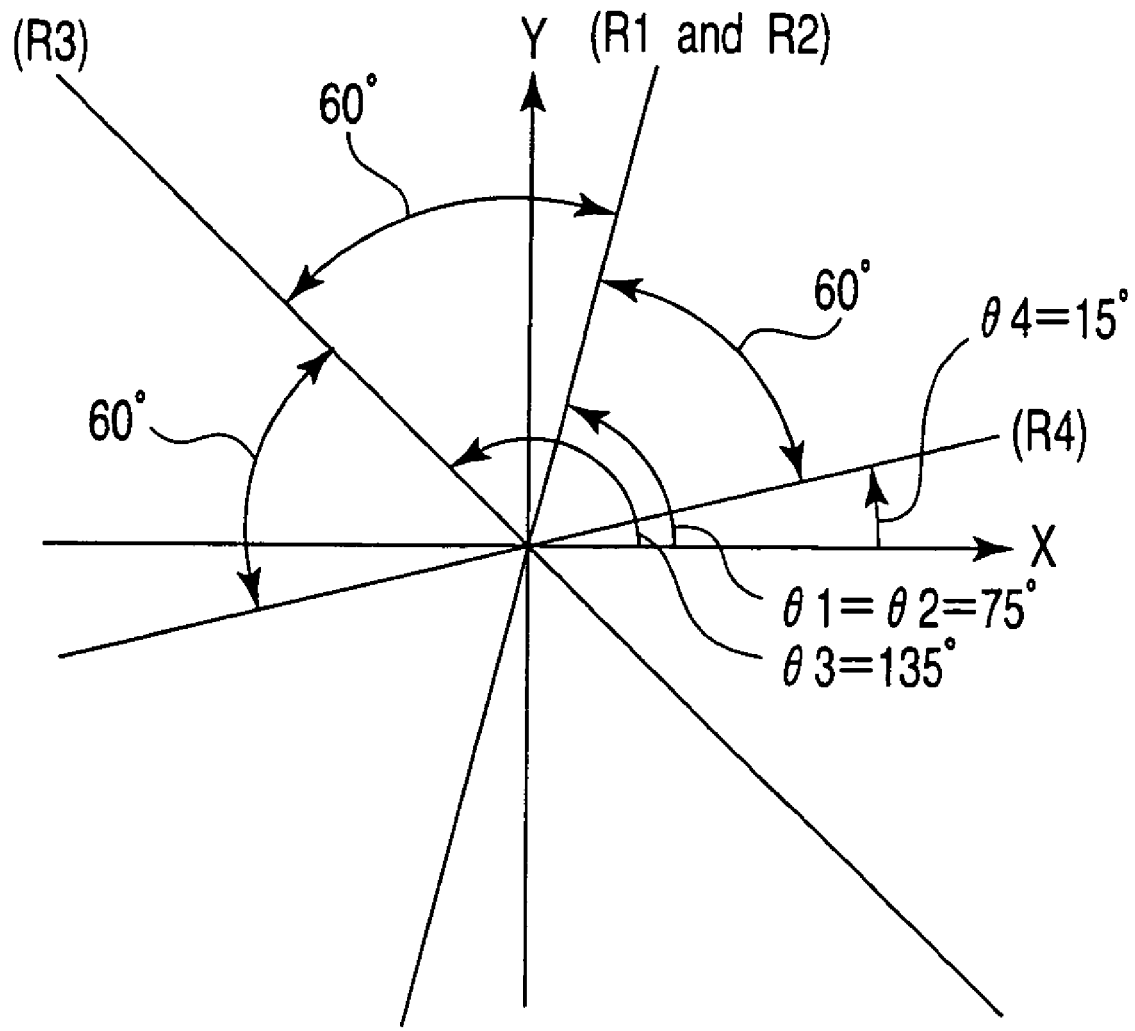
FIG. 6D is a view for explaining the relationship between crossed-axes angles of slow axes of the phase phases under the condition that a maximum contrast area value is obtained.
Figure 7:
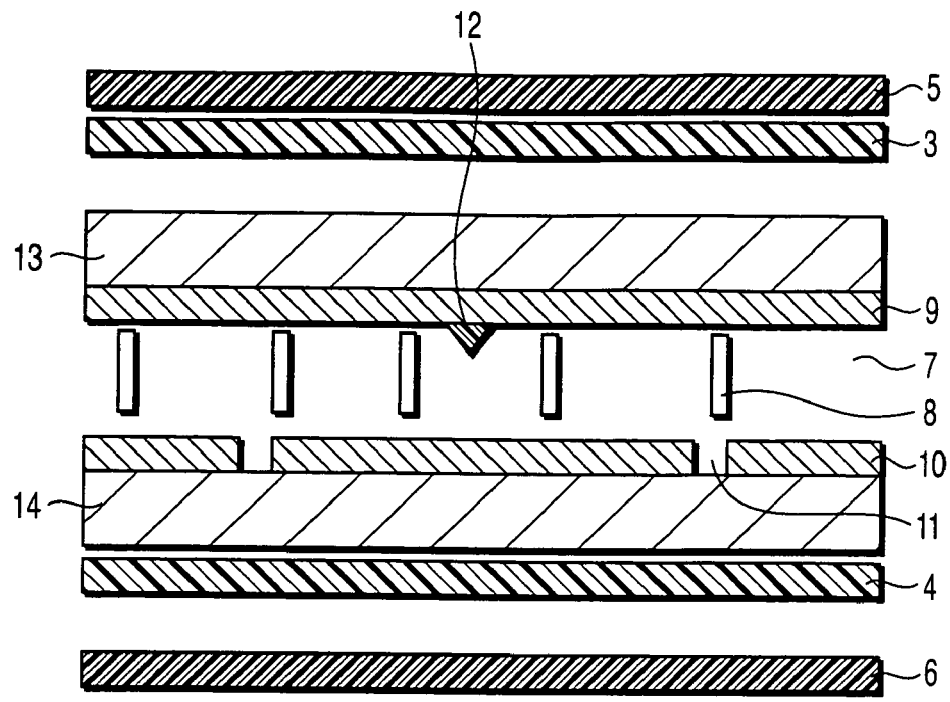
FIG. 7 is a view for explaining an example of the cross-sectional structure of a prior-art liquid crystal display device.
Figure 8:
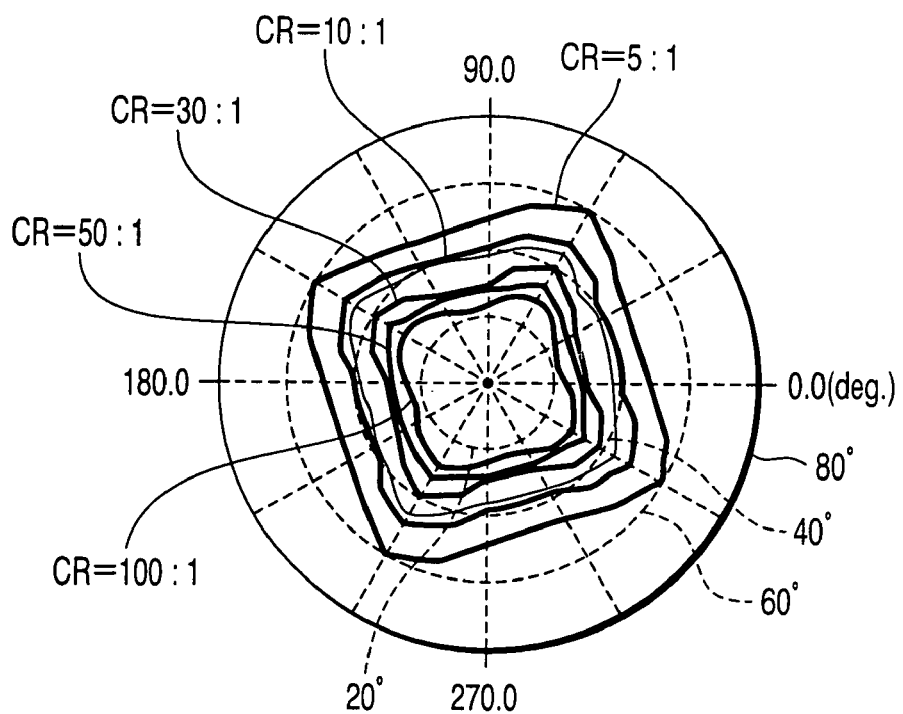
FIG. 8 shows an example of isocontrast curves of the liquid crystal display device shown in FIG. 7.
Figure 9:
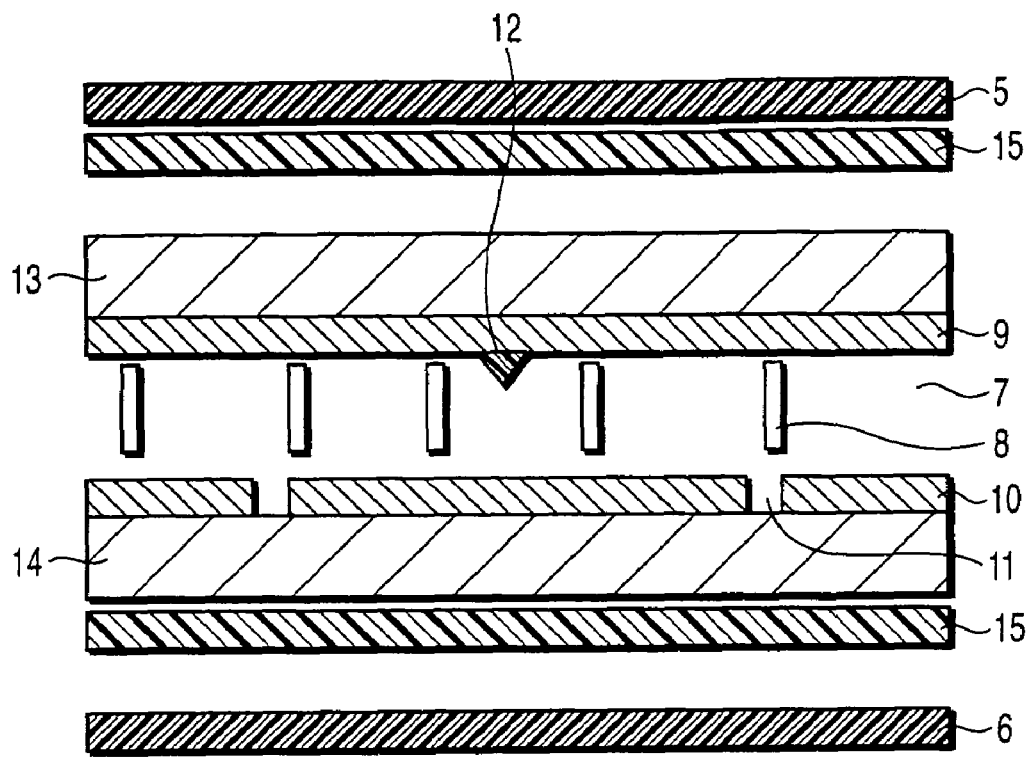
FIG. 9 is a view for explaining an example of the cross-sectional structure of a prior-art liquid crystal display device.
Figure 10:
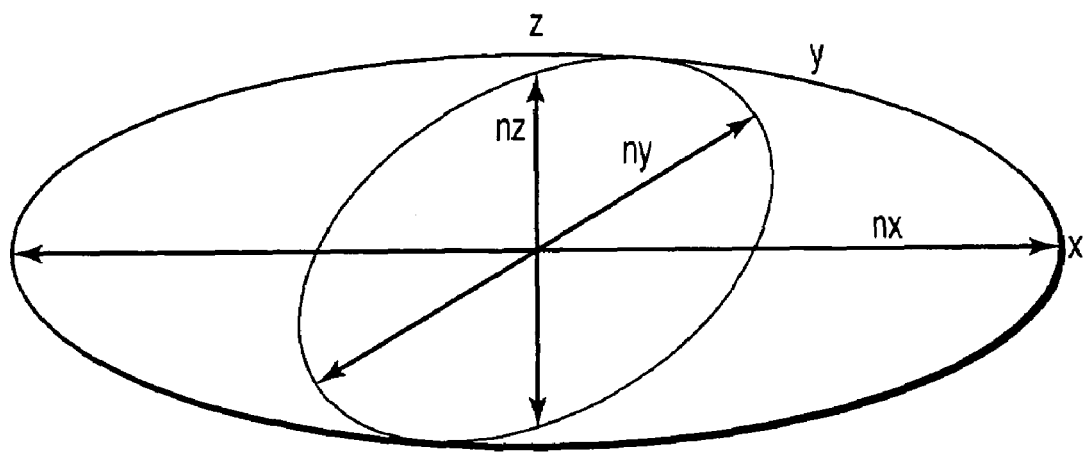
FIG. 10 is a view for explaining the shape of a refractive index ellipsoid of a biaxial ¼ wavelength plate that is used in the liquid crystal display device shown in FIG. 9.
Figure 13:
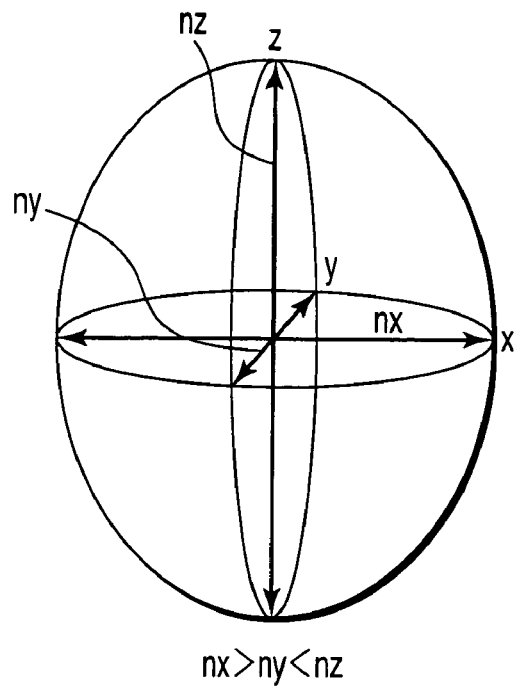
FIG. 13 is a view for explaining the shape of a refractive index ellipsoid of a biaxial ¼ wavelength plate that is used in the liquid crystal display device shown in FIG. 12.
Figure 14:
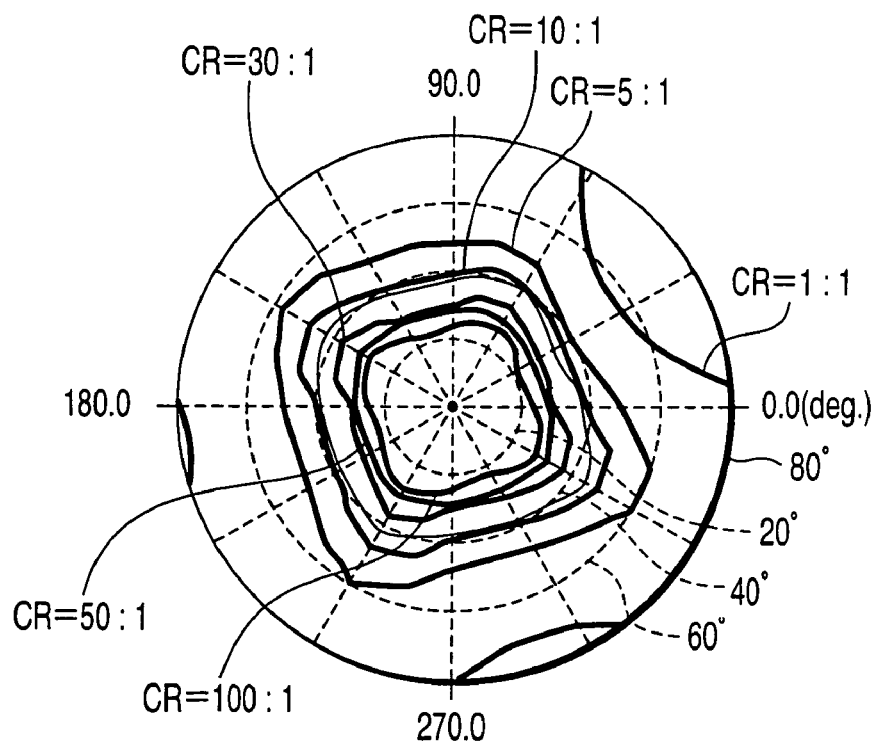
FIG. 14 shows an example of isocontrast curves of the liquid crystal display device shown in FIG. 12.

The crossed-axes angles between the slow axes in the planes of these three ½ wavelength plates are all $60°$, as shown in FIG. 6D. In short, the slow axes of the phase plates are distributed in a rotation-symmetry fashion in the planes. It is thus considered that the effects of the slow axes of the phase plates were dispersed (or in-plane anisotropies were mutually canceled), and a high contrast ratio was obtained in almost all directions.

As has been described above, the present invention provides a novel structure of a liquid crystal display device. This structure aims at preventing a decrease in transmittance, which occurs when liquid crystals are schlieren-oriented or orientated in an unintentional direction in a display mode, such as a vertical alignment mode or a multi-domain vertical alignment mode, in which the phase of incident light is modulated by about ½ wavelength in the liquid crystal layer. This invention can solve such problems that the viewing angle characteristic range is narrow and the manufacturing cost of components that are used is high, in the circular-polarization-based display mode in which circularly polarized light is incident on the liquid crystal layer, in particular, in the circular-polarization-based MVA display mode.

According to the novel structure, like the conventional circular-polarization-based MVA mode, high transmittance characteristics can be obtained and excellent contrast/viewing angle characteristics are realized. Moreover, the manufacturing cost is lower than in the circular-polarization-based MVA mode using the conventional viewing angle compensation structure.

The present invention is not limited to the above-described embodiments. At the stage of practicing the invention, various modifications and alterations may be made without departing from the spirit of the invention. Structural elements disclosed in the embodiments may properly be combined, and various inventions can be made. For example, some structural elements may be omitted from the embodiments. Moreover, structural elements in different embodiments may properly be combined.

The polarizer structure P and analyzer structure A are constructed as perfect circular polarizers so that black display can be realized in the state in which an in-plane phase difference of the variable retarder structure VR is substantially zero. Alternatively, the polarizer structure P and analyzer structure A may be constructed as elliptical polarizers that convert linearly polarized light, which emerges from the respective polarizer plates, to elliptically polarized light and emit the elliptically polarized light. In this case, one of the polarizer structure P and analyzer structure A is a clockwise elliptical polarizer, and the other is a counterclockwise elliptical polarizer. If the optical axes of the elliptical polarizers are set such that the major axes of the elliptically polarized lights emitted from these elliptical polarizers may interest at right angles, the same advantageous effect as with the above-described embodiment can be obtained.

The state in which the in-plane phase difference of the variable retarder structure VR is substantially zero corresponds to a state in which liquid crystal molecules in the liquid crystal layer 7 are aligned substantially vertical to the substrate. Even in the case where the liquid crystal layer has an in-plane phase difference, the state in which the in-plane phase difference is substantially zero can be realized by disposing a phase plate that compensates the in-plane phase difference. Specifically, when liquid crystal molecules are aligned at an angle less than $90°$ to the substrate, an in-plane phase difference occurs between the in-plane orientation direction of the inclined liquid crystal molecules and a direction perpendicular to this in-plane orientation direction. If a phase plate, which has an in-plane slow axis in a direction substantially perpendicular to the slow axis in the plane of this liquid crystal layer, is provided, a state in which the sum of in-plane phase differences of the phase plate and liquid crystal layer is substantially zero can be realized. Even in the case of the variable retarder structure, wherein the state in which the in-plane phase difference is substantially zero is realized by combining the phase plate and liquid crystal layer, the optimized polarizer structure P and analyzer structure A may be combined and the same advantageous effect as with the above-described embodiment can be obtained.

What is claimed is:

1. A liquid crystal display device comprising:
 a first polarizer plate that is disposed on one side of a liquid crystal cell in which a liquid crystal layer is sandwiched between two electrode-equipped substrates;
 a second polarizer plate that is disposed on the other side of the liquid crystal cell;
 a first phase plate that is disposed between the first polarizer plate and the liquid crystal cell;
 a second phase plate that is disposed between the second polarizer plate and the liquid crystal cell;
 a third phase plate that is disposed between the first polarizer plate and the first phase plate; and
 a fourth phase plate that is disposed between the second polarizer plate and the second phase plate,
 wherein
 the first phase plate and the third phase plate cooperate to impart a phase difference of a ¼ wavelength to linearly polarized light that emerges from the first polarizer plate, and the second phase plate and the fourth phase plate cooperate to impart a phase difference of a ¼ wavelength to linearly polarized light that emerges from the second polarizer plate, slow axes in planes of the first phase plate and the second phase plate are substantially parallel, a slow axis of the first phase plate and the second phase plate, a slow axis of the third phase plate and a slow axis of the fourth phase plate are disposed in such directions as to cancel in-plane anisotropies a crossed-axes angle between slow axes in planes of the first phase plate and the third phase plate is 60°, a crossed-axes angle between slow axes in planes of the second phase plate and the fourth phase plate is 60°, and a crossed-axes angle between slow axes in planes of the third phase plate and fourth phase plate is 60°.

2. The liquid crystal display device according to claim 1, further comprising:

a variable retarder structure that includes the liquid crystal cell;

a polarizer structure that includes the first polarizer plate, the first phase plate and the third phase plate; and an analyzer structure that includes the second polarizer plate, the second phase plate and the fourth phase plate, wherein the polarizer structure and the analyzer structure are configured such that black display is effected in a state in which an in-plane phase difference of the variable retarder structure is substantially zero.

3. The liquid crystal display device according to claim 2, wherein the liquid crystal display device is a vertical-electric-field type electrically controlled birefringence mode liquid crystal display device that is provided with means for applying a voltage between the two electrode-equipped substrates.

4. The liquid crystal display device according to claim 3, wherein the liquid crystal layer is formed of a nematic liquid crystal composition, and liquid crystal molecules in the liquid crystal layer are aligned substantially vertical to a major surface of the substrate in a state in which no voltage is applied to the liquid crystal layer.

5. The liquid crystal display device according to claim 3, wherein the liquid crystal display device has a multi-domain structure in which liquid crystal molecules within a pixel are oriented at least in two directions, regardless of a state in which a predetermined voltage is applied or irrespective of an applied voltage.

6. The liquid crystal display device according to claim 5, wherein a protrusion for multi-domain control is provided within the pixel.

7. The liquid crystal display device according to claim 5, wherein a slit for multi-domain control is provided in the electrode.

8. The liquid crystal display device according to claim 5, wherein orientation films, which are subjected to an orientation process for multi-domain control, are provided on those surface of the two substrates, which sandwich the liquid crystal layer.

9. The liquid crystal display device according to claim 1, wherein the first phase plate and the third phase plate have the same characteristics of wavelength dispersion of phase difference, and the second phase plate and the fourth phase plate have the same characteristics of wavelength dispersion of phase difference.

10. The liquid crystal display device according to claim 9, wherein when an angle $\theta p1$ is formed between a transmission axis of the first polarizer plate and a reference axis, an angle $\theta 1$ is formed between the slow axis of the first phase plate and the reference axis, and an angle $\theta 3$ is formed between the slow axis of the third phase plate R3 and the reference axis, a relationship, $$\theta 1 = \theta p1 + 2 \cdot (\theta 3 - \theta p1) \pm \pi/4,\ 0 \leq \theta 1 \leq \pi$$

is established between $\theta p1$, $\theta 1$ and $\theta 3$, and when an angle $\theta p2$ is formed between a transmission axis of the second polarizer plate and the reference axis, an angle $\theta 2$ is formed between the slow axis of the second phase plate and the reference axis, and an angle $\theta 4$ is formed between the slow axis of the fourth phase plate and the reference axis, a relationship, $$\theta 2 = \theta p2 + 2 \cdot (\theta 4 - \theta p2) \pm \pi/4,\ 0 \leq \theta 2 \leq \pi$$

is established between $\theta p2$, $\theta 2$ and $\theta 4$.

* * * * *